(12) United States Patent
Matsumoto et al.

(10) Patent No.: US 9,403,086 B2
(45) Date of Patent: Aug. 2, 2016

(54) ELECTRONIC GAME WITH OVERLAY CARD

(75) Inventors: Tsuyoshi Matsumoto, Kisarazu (JP); Masaru Kuribayashi, Kyoto (JP)

(73) Assignee: Disney Enterprises, Inc., Burbank, CA (US)

( * ) Notice: Subject to any disclaimer, the term of this patent is extended or adjusted under 35 U.S.C. 154(b) by 834 days.

(21) Appl. No.: 13/096,487

(22) Filed: Apr. 28, 2011

(65) Prior Publication Data

US 2011/0201427 A1    Aug. 18, 2011

Related U.S. Application Data

(63) Continuation of application No. 11/673,430, filed on Feb. 9, 2007, now Pat. No. 7,993,201.

(60) Provisional application No. 60/766,769, filed on Feb. 9, 2006.

(51) Int. Cl.
  *A63F 13/00*   (2014.01)
  *A63F 13/40*   (2014.01)

(52) U.S. Cl.
  CPC ......... *A63F 13/10* (2013.01); *A63F 2300/1075* (2013.01); *A63F 2300/69* (2013.01)

(58) Field of Classification Search
  USPC .......................................................... 463/47
  See application file for complete search history.

(56) References Cited

U.S. PATENT DOCUMENTS

| | | | |
|---|---|---|---|
| 5,594,471 A | 1/1997 | Deeran | |
| 6,492,978 B1 | 12/2002 | Selig | |
| 6,572,378 B1 * | 6/2003 | Rehkemper et al. | 434/85 |
| 6,636,203 B1 | 10/2003 | Wong | |
| 6,738,049 B2 | 5/2004 | Kiser | |
| 2002/0021289 A1 | 2/2002 | Combs et al. | |
| 2002/0156866 A1 * | 10/2002 | Schneider | 709/218 |
| 2005/0164148 A1 | 7/2005 | Sinclair | |
| 2006/0050061 A1 * | 3/2006 | Aiken et al. | 345/173 |
| 2007/0298387 A1 * | 12/2007 | McIlvain et al. | 434/163 |

FOREIGN PATENT DOCUMENTS

| | | |
|---|---|---|
| EP | 0672981 A1 | 9/1995 |
| JP | H7-261922 | 10/1995 |
| JP | 3082200 | 8/2000 |
| WO | 2006040697 A1 | 4/2006 |

OTHER PUBLICATIONS

Communication pursuant to Article 94(3) EPC; Application No. 07 756839.2-2218, European Patent Office, dated Jul. 18, 2011.
Mattel Electronics, "Intellivision Intelligent Television Cartridge Instructions Baseball" XP-002544228, 1979, pp. 1-15.
JP Office Action issued on Sep. 11, 2012 from JP Patent Application No. 2008-554527 (and English Translation).

* cited by examiner

*Primary Examiner* — Tramar Harper
(74) *Attorney, Agent, or Firm* — Marsh Fischmann & Breyfogle LLP; Kent A. Lembke

(57) ABSTRACT

Systems and methods related to game consoles, game software and games for play on a game console having a touch screen interface. A card having a pattern defined therein is overlaid on the touch screen. The defined pattern is used to activate portions of the touch screen by guiding user interaction with a touch pad or touch screen. The activated portions of the touch pad or touch screen launch responsive activity in a computer program implemented on the game console.

12 Claims, 4 Drawing Sheets

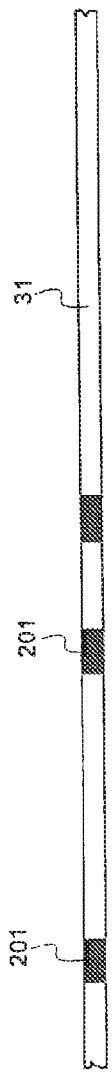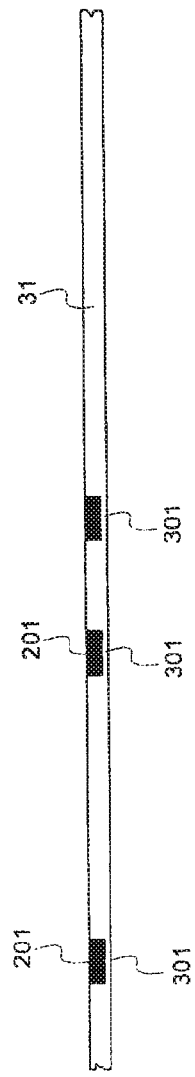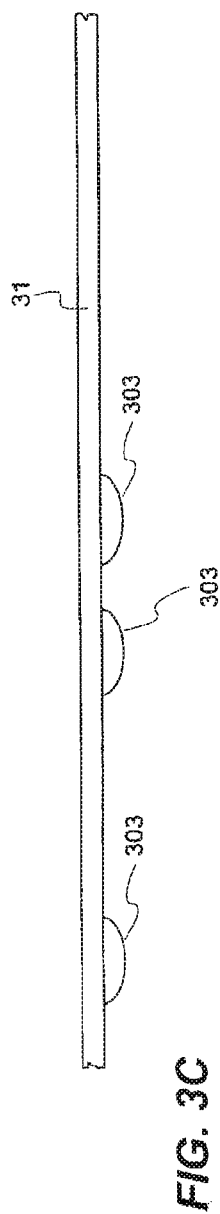
FIG. 3A
FIG. 3B
FIG. 3C

ELECTRONIC GAME WITH OVERLAY CARD

CROSS-REFERENCE TO RELATED APPLICATIONS

This application is a continuation of U.S. patent application Ser. No. 11/673,430, filed Feb. 9, 2007, entitled, "Electronic Game with Overlay Card," which claims the benefit of provisional application No. 60/766,769, filed Feb. 9, 2006, which is incorporated herein by reference in its entirety.

BACKGROUND OF THE DISCLOSURE

1. Field of the Disclosure

The present disclosure relates to electronic games. In particular, it relates to electronic games having tangible overlay card.

2. General Background

Portable or hand-held game machines continue to increase in popularity. Typically, these portable game machines include a hand-held game machine housing a processing unit and memory for executing a stored game program, as well as associated hardware such as a display for displaying images of the game and controls for implementing user interaction. The game program itself is typically contained in a game program memory such as, for example, a semiconductor memory (e.g., ROM, EPROM, and the like) that is part of a removable cartridge. User input to general-purpose computers is generally implemented through keyboards and control buttons. Graphical user interfaces implement pointing devices such as mice and touch pads that are commonly used with general-purpose computers, but less frequently used in game consoles. Game consoles support special purpose user input devices such as joysticks, special purpose buttons, rocker switches and the like.

More recently, handheld game devices have been introduced that include touch screen input devices. Touch screens comprise a display device together with touch-sensitive overlays that typically comprise either pressure-sensitive (resistive), electrically sensitive (capacitive), acoustically sensitive (SAW—surface acoustic wave) or photosensitive (infrared). The touch-sensitive overlays allows a display to be used as an input device, removing the keyboard and/or the mouse as the primary input device for interacting with the display's content. Such displays can be attached to computers or, as terminals, to networks. One example of a game console incorporating a touch screen as a user interface is the Nintendo® DS™ available from Nintendo of America, Inc.

Touch pads and touch screens enable user input via a pointer such as a finger or more commonly a stylus. A touch pad is akin to a graphics tablet in that it does not include an active display and instead presents a blank surface to the user. In the case of a touch screen, the display beneath the touch screen overlay displays one or more graphic controls that a user selects by touching a portion of the screen overlay above the displayed control with the stylus or other device. In a manner similar to clicking on a screen element using a mouse in a conventional computer, processes executing on the game console detect the selection of the graphic control by the user and launch a programmed responsive behavior. In the context of a game, the selection may cause a character in the game to take a particular action, load a new background, or any desired programmed response.

Computer games often involve the gradual revelation of information and/or additional tools as a game progresses and a player's character gains experience, for example. An entirely self-contained game provides some means to for a player to obtain all of the tools and reveal all of the information contained in the game. However, some games require outside information such as "cheat codes" in order to obtain particular tools, weapons, modes of play, or to learn secret information that is not otherwise available by simply playing the game itself. Because these codes are very much a part of the game to many players, web sites and books have become available to give, sell, or exchange these cheat codes.

Such books are examples of auxiliary products that can enhance the overall user experience and market value of a game. Other examples of auxiliary products include trading cards, stickers, tattoos, tip sheets and the like that can be purchased with a game or separately. In the case of trading cards, secondary games have been developed using the trading cards. The trading card games are substantially separate from the electronic game played on a console, although characters, scenes and situations may be common between them. While existing forms of auxiliary products provide some enhancement of the user experience, they do not directly affect game play of the computer game implemented on the game console.

Accordingly, a need exists for products that interact more directly with a game console and a game implemented on a game console. More specifically, a need exists for systems and methods for providing new ways of user interaction with a computer game using auxiliary products such as trading cards, game cards, coupons and other forms of touch screen overlays.

SUMMARY

Briefly stated, the present invention involves systems and methods related to game consoles, game software and games for play on a game console having a touch screen interface. A card having a pattern defined therein is overlaid on the touch screen. The defined pattern is used to activate portions of the touch screen by guiding user interaction with a touch pad or touch screen. The activated portions of the touch pad or touch screen launch responsive activity in a computer program implemented on the game console.

In another aspect the present invention involves a card that is sized to interface with a touch pad or touch screen of a computing device. A pattern is formed in or on the card, wherein the pattern is traceable by a user to guide the user's interaction with the touch pad or touch screen. The pattern comprises a point, line, two-dimensional shape or a combination of thereof. The pattern may be cut into the card, printed on a card surface, or a protrusion from the card surface. The card may be whole or may be cut in smaller pieces that can be assembled in to form a whole card.

In yet another aspect the present invention involves a computer game comprising computer-implemented code having code constructs implementing an interface to a touch pad or touch screen of a computer executing the software. Game play processes within the computer-implemented code are responsive to user inputs from the touch screen to determine whether pre-specified patterns are input through the touch pad or touch screen. The pre-specified patterns are embodied in an overlay card that physically overlays the touch pad or touch screen in operation.

BRIEF DESCRIPTION OF THE DRAWINGS

FIG. 3A-FIG. 3C illustrate in cross section alternative mechanisms for implementing an overlay card in accordance with the present invention.

DETAILED DESCRIPTION

Figure 1:
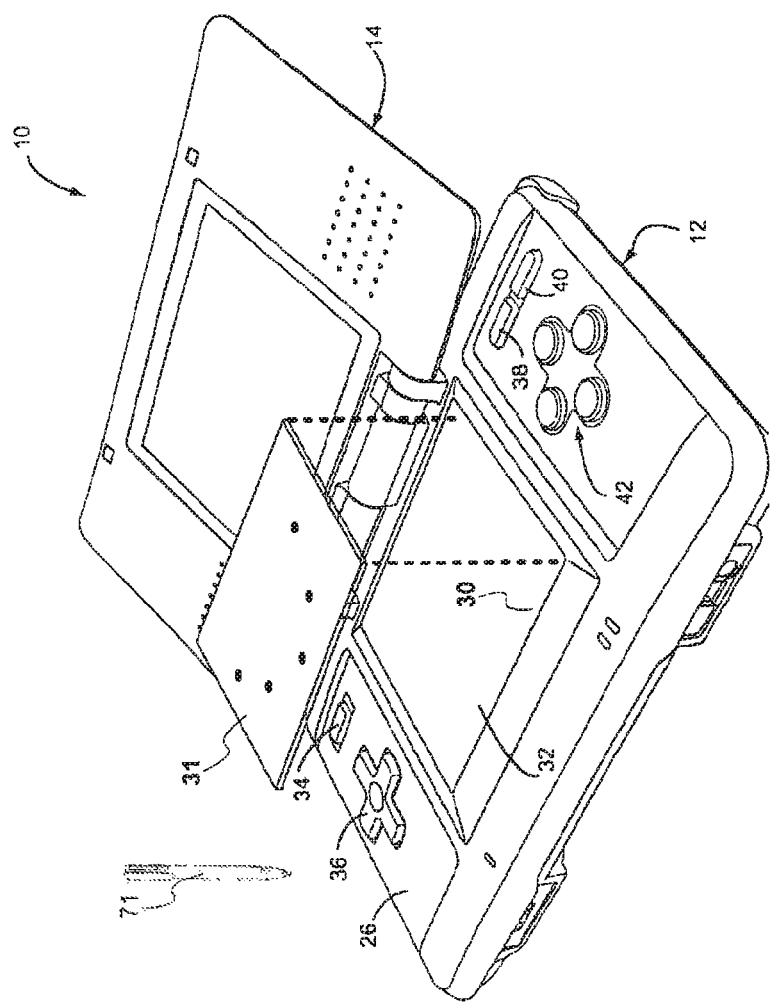
FIG. 1 illustrates a game system in accordance with an embodiment of the present invention.

FIG. 1 shows an embodiment of a game device or console 10 suitable for use in conjunction with the present invention. Console 10 includes a main body 12 and a cover body 14 connected to each other along an upper edge of the main body 12 and a lower edge of the cover body 14. In the implementation shown in FIG. 1, hinge elements on main body 12 mesh with hinge elements on the cover body 14, with a hinge pin (not shown) extending through the aligned hinge elements.

In the example of FIG. 1 a first display screen 32 is recessed within the upper face 26 of the main body 12. Display screen 32 comprises, for example, a backlit, color liquid crystal display (LCD). Display screen 32 is touch sensitive and may be activated by a stylus 71. Stylus 71 comprises a plastic pencil-shaped device with a rounded tip that is used to activate the touch screen 32. The transition at the edge 30 of display screen 32 may be tapered, curved or abrupt. Edges 30 provide a convenient mechanism for registration of the overlay card 31 in accordance with the present invention by aligning edges 33 of overlay card 31 with edges 30 of display screen 32.

In the upper right corner of the main body 12, there are side-by-side "start" and "select" buttons 38, 40, respectively, with X/Y/A/B buttons 42 located adjacent and below the "start" and "select" buttons, Buttons 38, 40 and 42 are also used for game play control. A cross-shaped directional control button 36 is located adjacent and below the power button 34, and is used for game play control. Additional control buttons may be located on the peripheral edge of main body 12 or at other desired locations on the upper face 26.

Figure 2A:
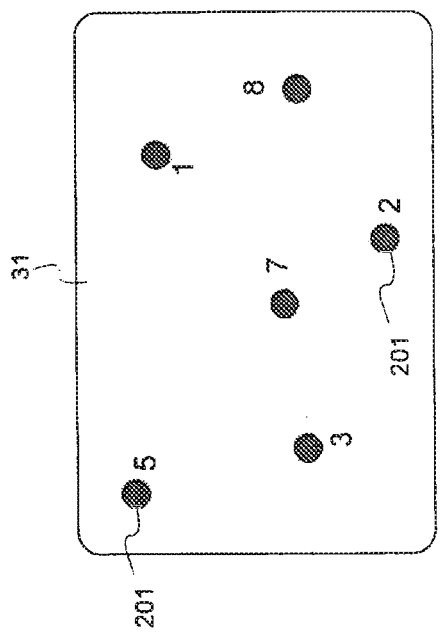
FIG. 2A-FIG. 2D illustrate several exemplary implementations of overlay cards in accordance with the present invention.

FIG. 2A-FIG. 2D illustrate several exemplary implementations of overlay cards in accordance with the present invention. FIG. 2A illustrates an embodiment similar to that shown in FIG. 1 in which an overlay card 31 contains a pattern 201. Overlay card 31 is constructed from a material such as paper, pressboard, cardboard, plastic, metal or the like. In a particular implementation overlay card 31 is roughly the thickness of a playing card, but may be substantially thicker or thinner in particular applications.

In one embodiment overlay card 31 is sized to fit snugly within the recess defined by edges 30 of a particular game console. In this manner, one face of card 31 contacts touch screen 32 and card 31 is registered with a relatively high degree of precision with touch screen 32. In an alternative embodiment overlay card 31 may be sized smaller than touch screen 32 and some other means of registering card 31 with screen 32 is used. For example, touch screen 32 may display one or more alignment marks or images allowing card 31 to be aligned with touch screen 32 using the visible alignment marks. Card 31 may be larger than touch screen 32 by forming it of a sufficiently flexible material such as paper, foil, plastic film, and the like.

Pattern 201 is defined by punched holes 201 in the implementation of FIG. 2A. Holes 201 may extend completely through card 31 as shown in FIG. 3A or may extend partially through card 31 as shown in FIG. 3B. Alternatively, pattern 201 may be printed only, without punched or holes, when the material chosen for card 31 is sufficiently conformable so that activity of a stylus on the printed pattern is translated to touch screen 32.

In this manner user input to touch screen 32 and in turn a game or other process executing on console 10 is guided by the pattern 201. In FIG. 2A the user places a cursor in or on each of the elements of pattern 201 and thereby specifies a sequence of inputs specified by that particular pattern 201. A large number limitless number of patterns may be defined to fit the needs of a particular application. Because the pattern 201 is physically encoded into or on card 201, the information is easy to enter as it does not require memorization of complex sequences of buttons or controls. Overlay card 31 can be manufactured and distributed efficiently and inexpensively, and the many materials available for overlay card 31 enable a wide range of product differentiation to further engage customers.

Figure 2B:
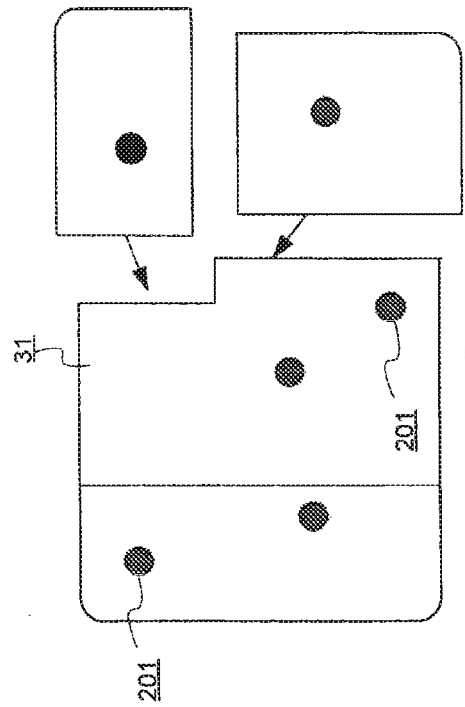

FIG. 2B illustrates an embodiment in which pattern 201 must be accessed by the user in a particular order indicated by printed indicia on a surface of card 31. A simple sequence of numbers is shown in FIG. 2B, however, the indicia may comprise other printed symbols or images that guide or prompt a user to select the desired sequence.

Figure 2C:
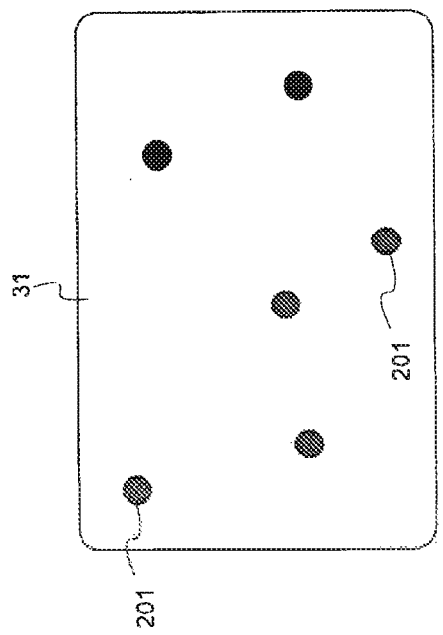

In the examples of FIG. 2A and FIG. 26 the pattern is defined by a collection of points or dots. FIG. 2C shows an embodiment in which pattern 201 comprises a line, arc and/or two-dimensional shape. A one- or two-dimensional pattern may be a line or an area that guides a user to follow the pattern with a stylus once card 31 is placed in contact with screen 32. In the case of an area such as the star shape in FIG. 2C, use of the card may require tracing the perimeter of the shape or may require the user to "fill in" the shape by scrubbing the area with a stylus. Additionally, a particular game may require the user to trace the card pattern 201 in a particular direction, or to trace the pattern multiple times such as back and forth. In any embodiment the game may require that a particular pattern be followed within specified time constraints.

Figure 2D:
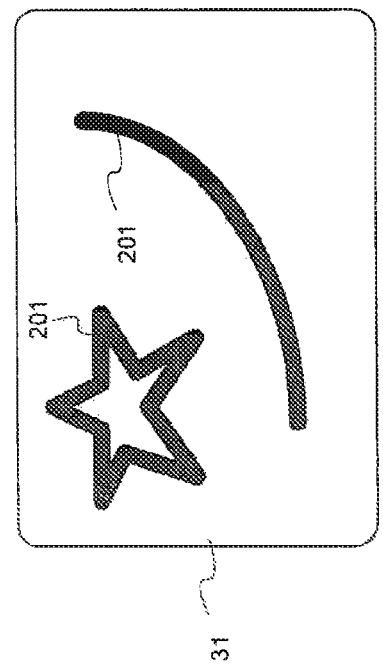

Optionally an overlay card may be implemented as multiple pieces such as shown in FIG. 2D. Once the pieces are fit together they form a complete overlay card 31 that can be used to interact with a game. The pieces can be formed so as to fit together in jigsaw fashion if desired. Such an implementation may be useful when the card pieces are distributed as a part of a retail incentive program to encourage repeat business, or similar distribution scheme.

FIG. 3A-FIG. 3C illustrate in cross section alternative mechanisms for implementing an overlay card in accordance with the present invention. In the embodiment of FIG. 3A pattern 201 extends entirely through the thickness of card 31. This can be accomplished by punching, die cutting, laser cutting, etching, or other technique suitable for a particular card material and production process. In the embodiment of FIG. 3A the card 31 can be used by placing a stylus 71 completely through the pattern 201 to contact the touch pad or touch screen. One or more elements of pattern 201 may be used as alignment marks as described hereinbefore.

In the embodiment of FIG. 3B pattern 201 comprises cavities that extend less than completely through card 31 to leave a thinner membrane portion. The membrane portion is sufficiently thin such that a touch pad or touch screen 32 can sense a stylus 71. The implementation of FIG. 3B can be formed by cutting patterns 201 partially through card 31 or by cutting a pattern 201 completely through card 31 and applying a layer of paper, plastic, or similar material to form the membrane portion. In this manner the pattern 201 can be obscured during distribution if desired to deter copying.

In the embodiment of FIG. 3C a pattern is formed by protrusions or bumps 303 on one surface of card 31. Bumps 303 may be formed by screen-printing, adhesives, or other available technique. In the case of a pressure sensitive screen bumps 303 allow a user to input a pattern into a touch pad or touch screen by rubbing the upper surface (i.e., a surface that faces a user) of card 32. This may allow a user to input complex patterns involving near simultaneous activation of a number of points on the touch screen 32 in a manner that would be difficult to perform using a stylus alone.

Figure 4:
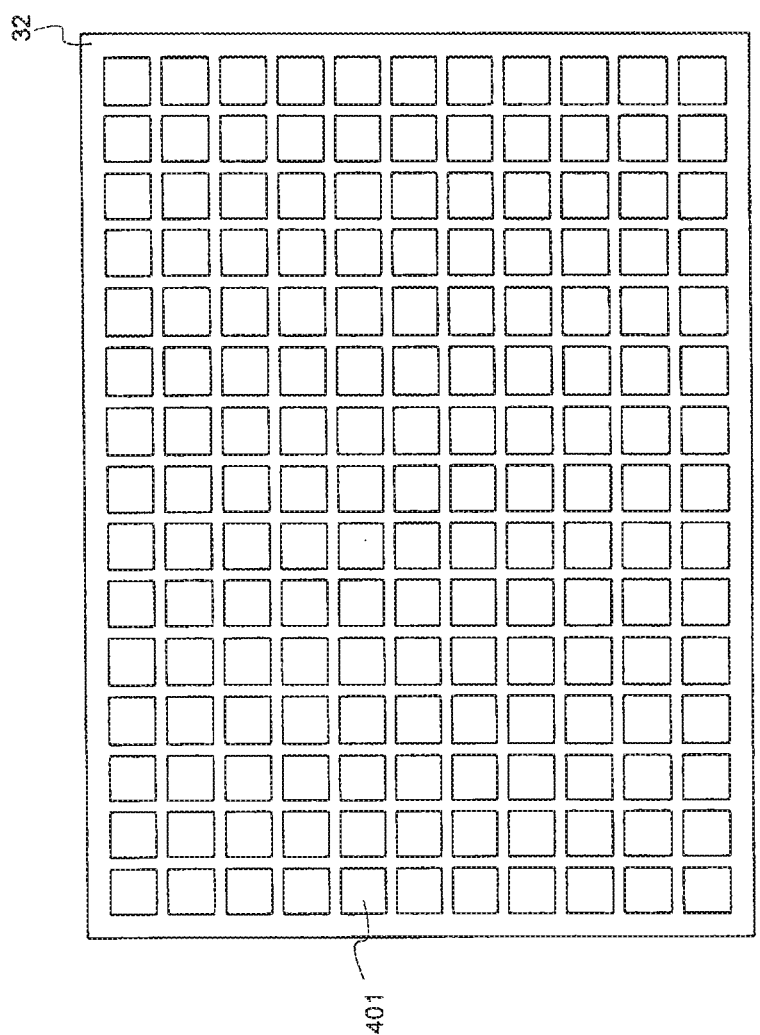
FIG. 4 illustrates a card point area defined by software in a particular implementation of the present invention.

FIG. 4 illustrates a card point area defined by software in a particular implementation of the present invention. In the embodiment of FIG. 4 the touch pad or touch screen writeable area is segmented into a 15×11 array. The granularity of this segmentation is a matter of design choice and is constrained only by the granularity permitted by the touch pad or touch screen mechanism. Less granular arrays may be easier to use and will be more forgiving to misalignment whereas more granular arrays allow more complex patterns to be defined and used. In operation the array may be fully populated such that all areas are active, or sparsely populated such that less than all of the areas are active. For example, if a game is at a point where only a certain card can be played, only elements corresponding to that card may need to be active. On the other hand, activating the entire array allows the program to detect when an incorrect sequence is entered indicating that an incorrect card has been played. Processes executing on the game console may take responsive action for incorrect use.

In operation a game program can be constructed such that a character obtains some benefit. For example, a character may grow stronger or more robust. A character may be given extra life or vitality, or be given new tools or weapons. A character may evolve or grow up more rapidly than permitted by normal game progression. Conversely, a card may signal a negative effect on a character such as weakening the character or stealing a tool or weapon.

Game developers program the effect of a particular card when designing a game. A particular effect is dormant until a particular pattern is applied to the touch pad or touch screen 32. The game may define specific times at which a card pattern may be applied such as at the beginning of a game or round. Alternatively or in addition a game may be designed to prompt a user to use a card if available.

Card 31 can be distributed entirely separate from the particular game with which it is associated. Moreover, a specific card 31 may be useful in more than one game. A game designer will publish, sell, or license the information about various features that can be activated by a game card, and any entity with sufficient rights in the pattern 201 for a particular game can manufacture and distribute cards 31 as desired. This separation of the game and card overlay is not required, but enables great flexibility in providing auxiliary products for a game that enhance the overall user experience.

It is apparent that the present invention is useful in a variety of applications other than computer games. The card overlay is generally useful for entering information using touch pad or touch screen input devices to computers where it is desirable for the user to trace a pattern or activate a sequence of points on the touch screen. Such operation might be useful in activating software or activating features in a software program.

Although certain illustrative embodiments and methods are disclosed herein, it will be apparent from the foregoing disclosure to those skilled in the art that variations and modifications of such embodiments and methods may be made without departing from the true spirit and scope of the art disclosed. Accordingly, it is intended that the art disclosed shall be limited only to the extent required by the appended claims and the rules and principles of applicable law.

The invention claimed is:

1. A game system, comprising:
a game console having a touch-sensitive pointing device including a touch screen, wherein the touch screen concurrently operates as a display displaying game content for a game and an input device receiving user input affecting the game, and displaying one or more alignment images on the touch-sensitive point device allowing an overlay card to be registered with the touch-sensitive pointing device, wherein a pre-selected pattern of portions can be physically activated when the overlay card is registered using the alignment images;
a computing device within the game console;
processes executing on the computing device for detecting use of the touch sensitive pointing device;
the overlay card having the pattern therein, wherein the pattern on the card guides use of the touch-sensitive pointing device wherein the overlay card physically overlays the touch screen defining the portions of the touch screen that may be user activated; and
processes executing on the computing device for taking responsive action to affect the game based on the detected use of the touch-sensitive pointing device including the portions of the touch screen activated by a user, wherein the affecting of the game includes modifying a portion of the game displayed on the touch screen at least partially in an area spaced apart from the defined portions of the touch screen that may be user activated.

2. The game system of claim 1, wherein the pattern comprises a cavity formed in the overlay card that extends less than completely through the overlay card.

3. The game system of claim 1, wherein the pattern comprises a raised area protruding away from a card surface so that the raised area engages the touch-sensitive pointing device and wherein, with user applied pressure on the overlay card, near simultaneous activation is provided for a number of points in the defined portions of the touch screen that may be user activated to cause the affecting of the game.

4. The game system of claim 1, wherein the processes executing on the computing device comprise processes that affect one or more of: a benefit to a character, a character's robustness, a character's strength, a character's life, a character's vitality, a character's tools or weapons, revelation of information, a mode of play, and revealing secret information.

5. The game system of claim 1, wherein the pattern comprises a collection of points and wherein the collection of the points defines a particular order for the activation of the portions of the touch screen whereby the processes executing on the computing device take the responsive action to affect the game play only when the particular order is followed by the user.

6. The game system of claim 1, wherein the pattern comprises one or more shapes selected from the group consisting of: a line, an arc, a curve, and a two-dimensional shape.

7. The game system of claim 1, wherein the defined portions correspond with active areas of the touch screen, the active areas being less than all of an exposed area of the touch screen.

8. A method of implementing a computer-implemented game on a console having a touch-sensitive pointing device, the method comprising:
providing a user with an overlay card having a pattern formed therewith;
detecting activity of the touch-sensitive pointing device;

determining whether the activity of the touch-sensitive pointing device corresponds to a pre-selected pattern of portions of the touch-sensitive pointing device corresponding to the pattern formed in the overlay card that indicates the user has activated the touch-sensitive pointing device using the overlay card by physically placing the overlay card over the touch-sensitive pointing device, wherein, when the pre-selected pattern of portions are activated according to a sequence of inputs defined by the overlay card;

modifying an aspect of the computer-implemented game which is concurrently displayed via the touch-sensitive pointing device; and displaying one or more alignment images on the touch-sensitive pointing device allowing the overlay card to be registered with the touch-sensitive pointing device, wherein the pre-selected pattern of portions can be physically activated when the overlay card is registered using the alignment images.

9. The method of claim 8, further comprising altering some aspect of the game based upon detecting that the activity of the touch-sensitive pointing device corresponds to use of the overlay card.

10. The method of claim 8, further comprising altering some aspect of the game based upon detecting that the activity of the touch-sensitive pointing device does not correspond to use of the overlay card.

11. The method of claim 8, wherein the card is provided with the computer-implemented game.

12. The method of claim 8, wherein the overlay card is provided separately from the computer-implemented game.

* * * * *